United States Patent
Krishnamurthy et al.

(10) Patent No.: US 10,079,911 B2
(45) Date of Patent: Sep. 18, 2018

(54) CONTENT ANALYSIS BASED SELECTION OF USER COMMUNITIES OR GROUPS OF USERS

(71) Applicant: International Business Machines Corporation, Armonk, NY (US)

(72) Inventors: Ram Krishnamurthy, Westford, MA (US); Anurag Srivastava, Pune (IN)

(73) Assignee: International Business Machines Corporation, Armonk, NY (US)

( * ) Notice: Subject to any disclaimer, the term of this patent is extended or adjusted under 35 U.S.C. 154(b) by 298 days.

(21) Appl. No.: 14/959,577

(22) Filed: Dec. 4, 2015

(65) Prior Publication Data

US 2017/0163763 A1  Jun. 8, 2017

(51) Int. Cl.
| | |
|---|---|
| H04N 21/25 | (2011.01) |
| H04L 29/08 | (2006.01) |
| H04L 12/58 | (2006.01) |
| H04N 21/20 | (2011.01) |
| H04N 21/231 | (2011.01) |
| H04N 21/218 | (2011.01) |

(52) U.S. Cl.
CPC ............ *H04L 67/327* (2013.01); *H04L 51/32* (2013.01); *H04N 21/20* (2013.01); *H04N 21/218* (2013.01); *H04N 21/23109* (2013.01); *H04N 21/25* (2013.01)

(58) Field of Classification Search
CPC ......... G06F 17/30035; G06F 17/30247; G06F 17/30595; G06F 17/30867; G06Q 10/10; G06Q 30/00; G06Q 30/0269; H04L 67/02; H04L 67/327; H04L 51/32; H04N 21/20; H04N 21/218; H04N 21/23109; H04N 21/25
See application file for complete search history.

(56) References Cited

U.S. PATENT DOCUMENTS

| | | | |
|---|---|---|---|
| 7,945,535 B2 | 5/2011 | Toutonghi et al. | |
| 2010/0191689 A1 | 7/2010 | Cortes et al. | |
| 2011/0060645 A1* | 3/2011 | Sweeney | G06Q 30/00 705/14.43 |
| 2013/0297714 A1 | 11/2013 | Basu et al. | |
| 2014/0059179 A1 | 2/2014 | Lam | |

(Continued)

OTHER PUBLICATIONS

"Automated on-line synchronization service for social network content", IBM, http://ip.com/IPCOM/000189176, An IP.com Prior Art Database Technical Disclosure, Oct. 30, 2009, 8 pages.

(Continued)

*Primary Examiner* — Le H Luu
(74) *Attorney, Agent, or Firm* — Stephen R. Ikacs; Stephen J. Walder, Jr.; Jeffrey L. Kelly

(57) ABSTRACT

A mechanism is provided in a data processing system for content analysis based automatic selection of user communities or groups of users. The mechanism receives content to be published from a user and performing content analysis on the content to identify a context of the content. The mechanism identifying a social collaboration community based on the user's associations with social collaboration communities, the context of the content, and a community registry of social collaboration communities. The mechanism publishes the content in the identified social collaboration community.

18 Claims, 3 Drawing Sheets

(56) References Cited

U.S. PATENT DOCUMENTS

| | | | | |
|---|---|---|---|---|
| 2014/0337436 A1* | 11/2014 | Hoagland | ......... | G06F 17/30867 709/204 |
| 2015/0019550 A1* | 1/2015 | Maharajh | .......... | G06F 17/30035 707/736 |
| 2015/0066892 A1* | 3/2015 | Astore | .............. | G06F 17/30867 707/707 |
| 2015/0081725 A1* | 3/2015 | Ogawa | .............. | G06F 17/30595 707/754 |
| 2015/0089409 A1* | 3/2015 | Asseily | .................. | G06Q 10/10 715/765 |
| 2015/0127684 A1* | 5/2015 | Lourdeaux | ........ | G06F 17/30867 707/791 |
| 2015/0139540 A1* | 5/2015 | Moraleda | .......... | G06F 17/30247 382/164 |
| 2015/0161903 A1 | 6/2015 | Colliander | | |
| 2016/0071162 A1* | 3/2016 | Ogawa | ............... | G06Q 30/0269 705/14.66 |
| 2016/0080485 A1* | 3/2016 | Hamedi | .................. | H04L 67/02 709/204 |

OTHER PUBLICATIONS

"Monetizing, activity based autonomic group classification in a social domain", Anonymously, http://ip.com/IPCOM/000238761, An IP.com Prior Art Database Technical Disclosure, Sep. 17, 2014, 4 pages.

* cited by examiner

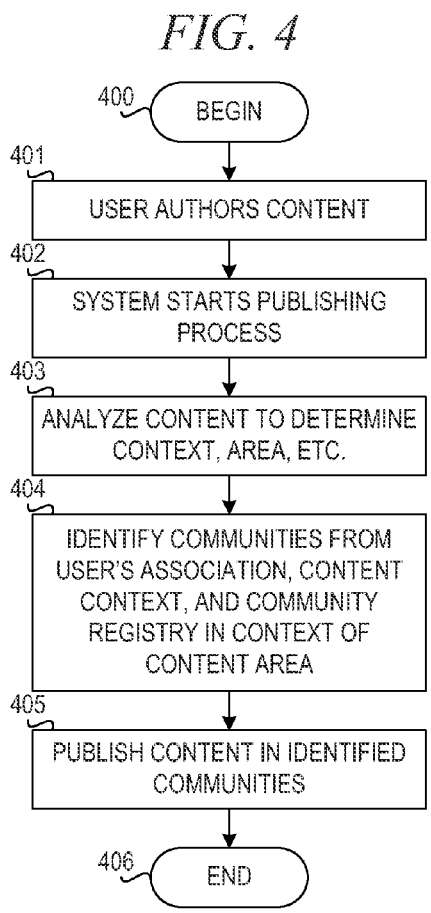
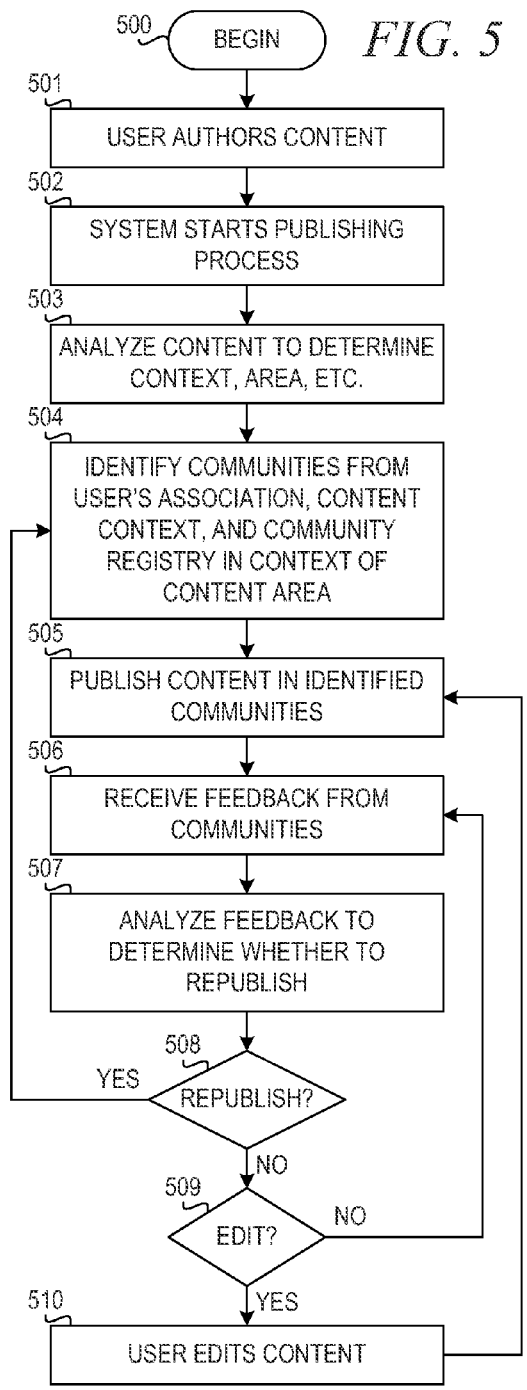

CONTENT ANALYSIS BASED SELECTION OF USER COMMUNITIES OR GROUPS OF USERS

BACKGROUND

The present application relates generally to an improved data processing apparatus and method and more specifically to mechanisms for content analysis based automatic selection of user communities or groups of users.

Social collaboration is a key growing area that will continue to grow in the future. Social collaboration is about content sharing and retrieval. Only a small percentage of people write content that is shared over the Internet for millions of users. This makes sharing content as the most important aspect of social collaboration.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for content analysis based automatic selection of user communities or groups of users. The method comprises receiving content to be published from a user and performing content analysis on the content to identify a context of the content. The method further comprises identifying a social collaboration community based on the user's associations with social collaboration communities, the context of the content, and a community registry of social collaboration communities and publishing the content in the identified social collaboration community.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4 is a flowchart illustrating operation of a community selection system for content analysis based automatic selection of user communities or groups of users in accordance with an illustrative embodiment; and FIG. 5 is a flowchart illustrating operation of a community selection system for multi-phased content publication in accordance with an illustrative embodiment.

DETAILED DESCRIPTION

Figure 1:
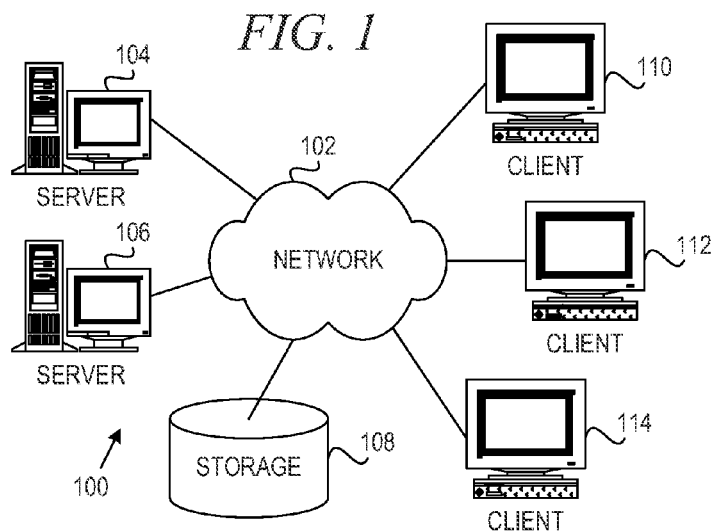
FIG. 1 is an example diagram of a distributed data processing system in which aspects of the illustrative embodiments may be implemented.

Content sharing is an important aspect of social collaboration. People write content, such as wikis, blogs, etc., and manually share the content with their connections. If the authors know about user communities, then they may add their content in these communities manually. This manual sharing of content with user connections or with the community of which a user is aware is highly inefficient.

Sometimes, an author wants to share content with a smaller group first and only after collecting feedback from this smaller group is the content made available to a larger audience. This process is also manual and error prone as sometimes users or communities are not selected in the first round, and the quality of feedback suffers.

The illustrative embodiments provide a mechanism for content analysis based automatic selection of user selection of user communities or groups of users. The mechanism helps authors or an enterprise increase the reach to share content with multiple communities or user groups by using content analysis, user registry, and community registry. The mechanism analyzes the content to understand the context or area to which the content belongs. The mechanism selects and suggests the communities or user connections to which the user may share or publish the content.

The user may preconfigure the delivery of content in multiple phases. After the content is published, the mechanism analyzes the responses from various feedback paths, such as comment, ratings, emails, etc., in each phase to determine the next set of users or communities with which to share the content. The user may also preconfigure a phase as the final phase in which content is to be made available to targeted communities or all possible communities. The user may not be part of all of the communities where content is published. The illustrative embodiments propose a relationship between communities. Using these relationships, the mechanism may publish content from a given community to a much larger number of related communities.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
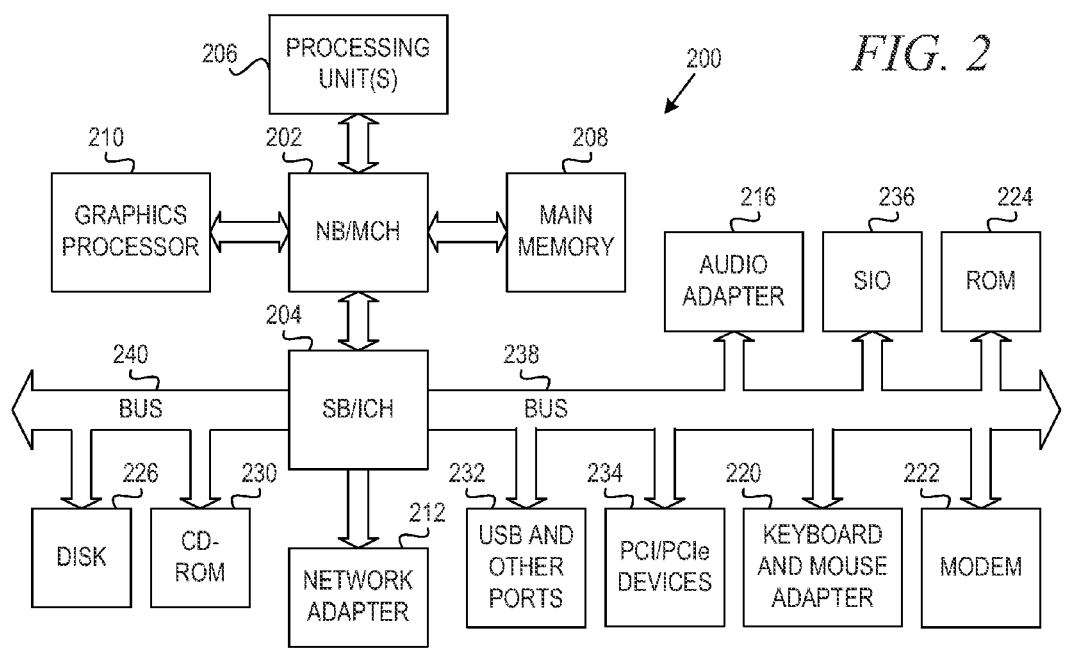
FIG. 2 is an example block diagram of a computing device in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement a content analysis based automatic selection of user communities or groups of users. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates content analysis based automatic selection of user communities or groups of users.

As noted above, the mechanisms of the illustrative embodiments utilize specifically configured computing devices, or data processing systems, to perform the operations for content analysis based automatic selection of user communities or groups of users. These computing devices, or data processing systems, may comprise various hardware elements which are specifically configured, either through hardware configuration, software configuration, or a combination of hardware and software configuration, to implement one or more of the systems/subsystems described herein.

FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external affects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System P® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to content analysis based automatic selection of user communities or groups of users.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SNIP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
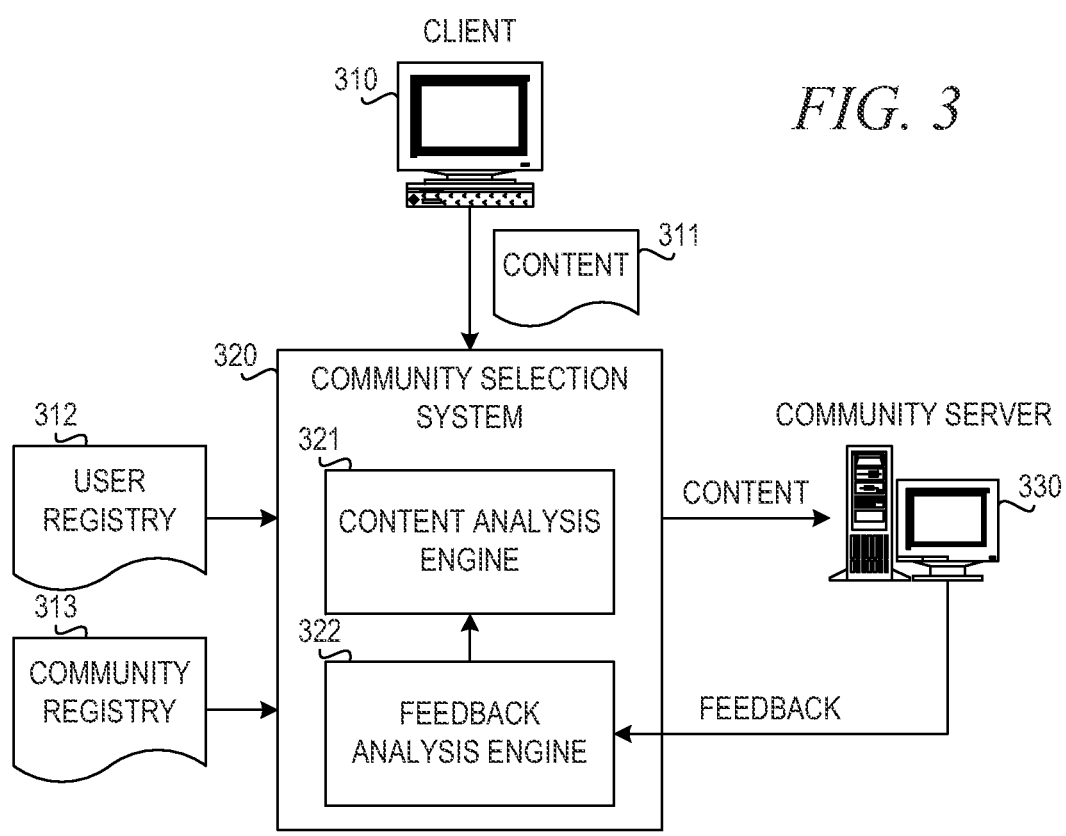
FIG. 3 is a block diagram of a system for content analysis based automatic selection of user communities or groups of users in accordance with an illustrative embodiment.

FIG. 3 is a block diagram of a system for content analysis based automatic selection of user communities or groups of users in accordance with an illustrative embodiment. A user at client 310 submits content 311 to community selection system 320. Community selection system 320 includes content analysis engine 321 and feedback analysis engine 322. Content analysis is a wide and heterogeneous set of manual or computer-assisted techniques for contextualized interpretations of documents, having as an ultimate goal the production of valid and trustworthy inferences. Community selection system 320 selects communities for publishing content 311 based on results of analysis by content analysis engine 321, user registry 312, and community registry 313.

Content analysis engine 321 performs content analysis in each phase of the content publishing process. Content analysis engine 321 analyzes the content 311 to understand the area that content is targeting and also understands the context. This analysis is used to identify correct communities or user groups to which to publish the content 311.

User registry 312 maintains each user's membership or association with various communities. Community registry 313 maintains relationships between different communities. Community selection system 320 uses community registry 313 to find a large number of communities in the context of content being published.

Based on results of content analysis engine 321, community selection system 320 identifies a community to publish content 311 to. Then, community selection system 320 publishes content to community server 330. Community server 330 may return feedback to community selection system 320. The feedback may comprise user comments, ratings, or the like.

Feedback analysis engine 322 analyzes various kinds of feedback received for the content 311. Community selection system 320 uses the results of this analysis to publish content 311 in a multi-phased process. Community selection system 320 collects the feedback from various feedback paths, and feedback analysis engine 322 analyzes the feedback to determine the overall context of the feedback. Based on the feedback analysis, content selection system 320 determines whether to republish content 311 with a larger audience whether to return content 311 to client 310 to be edited and re-shared.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the users computer, partly on the user's computer, as a stand-alone software package, partly on the user's computer and partly on a remote computer or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

FIG. 4 is a flowchart illustrating operation of a community selection system for content analysis based automatic selection of user communities or groups of users in accordance with an illustrative embodiment. Operation begins (block 400), and a user authors content (block 401). The system starts the publishing process (block 402). The system analyzes content to determine context or area to which the content belongs (block 403). The system identifies communities based on the user's associations, the content context, and a community registry in the context of the content area (block 404). The system publishes the content in the identified communities (block 405). Thereafter, operation ends (block 406).

FIG. 5 is a flowchart illustrating operation of a community selection system for multi-phased content publication in accordance with an illustrative embodiment. Operation begins (block 500), and a user authors content (block 501). The system starts the publishing process (block 502). The system analyzes content to determine context or area to which the content belongs (block 503). The system identifies communities based on the user's associations, the content context, and a community registry in the context of content area (block 504). The system publishes the content in the identified communities (block 505).

Then, the system receives feedback from the communities (block 506) and analyzes the feedback to determine whether to republish the content to a larger audience (block 507). For example, if the feedback is positive, then the system may determine that the content is appropriate to be published to a wider audience or to an audience with a higher or lower level of expertise. The system may consult a community registry to determine relationships between communities. For instance, the community registry may maintain a relationship between a first community and a second community such that the second community has a wider audience than the first community. As another example, the second community has an audience with a higher expertise level than the first community. As yet another example, the second community has an audience with a lower expertise level than the first community.

The system determines whether to republish the content to another community (block 508). If the system determines to republish the content, operation returns to block 504 to identify communities based on the content context, the community registry, and the context or content area. Then, the system publishes the content to the identified communities (block 505).

The system determines not to republish the content, then the system determines whether to return the content to the author to edit (block 509). If the system determines not to return the content to the author to edit, then operation returns to block 506 to receive feedback from the communities. If the system determines to return the content to the author to edit in block 509, then the user edits the content (block 510), and operation returns to block 505 to publish the edited content in the identified communities.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, at least one memory comprising instructions that are executed by the at least one processor to specifically configure the at least one processor to implement a community selection system for content analysis based automatic selection of user communities or groups of users, the method comprising:
receiving, by the community selection system from a client data processing system of a user, content authored by the user to be published;
performing, by a content analysis engine executing within the community selection system, content analysis on the content to identify a context of the content;
identifying, by the community selection system, one or more social collaboration communities to which the user belongs using a user registry data structure;
selecting, by the community selection system, a social collaboration community based on the identified one or more social collaboration communities to which the user belongs, the context of the content, and a community registry data structure of social collaboration communities;
publishing, by the community selection system, the content to a community server data processing system in the selected social collaboration community;
receiving, by the community selection system, feedback from the selected social collaboration community regarding the content;
analyzing, by a feedback analysis engine executing within the community selection system, the feedback; and
determining, by the community selection system, whether to republish the content to a second social collaboration community within the community registry data structure based on results of analyzing the feedback.

2. The method of claim 1, wherein the second community has a wider audience than the social collaboration community.

3. The method of claim 1, wherein the second community has an audience with a higher expertise level than the social collaboration community.

4. The method of claim 1, wherein the second community has an audience with a lower expertise level than the social collaboration community.

5. The method of claim 1, further comprising:
determining whether to return the content to the user to edit based on results of analyzing the feedback.

6. The method of claim 5, further comprising:
receiving edited content from the user; and
publishing the edited content to the social collaboration community.

7. A computer program product comprising a non-transitory computer readable storage medium having a computer readable program stored therein, wherein the computer readable program, when executed on a computing device, causes the computing device to implement a community selection system for content analysis based automatic selection of user communities or groups of users, wherein the computer readable program causes the computing device to:
receive, by the community selection system from a client data processing system of a user, content authored by the user to be published;
perform, a content analysis engine executing within the community selection system, content analysis on the content to identify a context of the content;
identify, by the community selection system, one or more social collaboration communities to which the user belongs using a user registry data structure;
select, by the community selection system, a social collaboration community based on the identified one or more social collaboration communities to which the user belongs, the context of the content, and a community registry data structure of social collaboration communities;
publish, by the community selection system, the content to a community server data processing system in the selected social collaboration community;
receive, by the community selection system, feedback from the selected social collaboration community regarding the content;
analyze, by a feedback analysis engine executing within the community selection system, the feedback; and
determine, by the community selection system, whether to republish the content to a second social collaboration community within the community registry data structure based on results of analyzing the feedback.

8. The computer program product of claim 7, wherein the second community has a wider audience than the social collaboration community.

9. The computer program product of claim 7, wherein the second community has an audience with a higher expertise level than the social collaboration community.

10. The computer program product of claim 7, wherein the second community has an audience with a lower expertise level than the social collaboration community.

11. The computer program product of claim 7, wherein the computer readable program further causes the computing device to:
determine whether to return the content to the user to edit based on results of analyzing the feedback.

12. The computer program product of claim 11, wherein the computer readable program further causes the computing device to:
receive edited content from the user; and
publish the edited content to the social collaboration community.

13. An apparatus comprising:
a processor; and
a memory coupled to the processor, wherein the memory comprises instructions which, when executed by the processor, cause the processor to implement a community selection system for content analysis based automatic selection of user communities or groups of users, wherein the instructions cause the processor to:
receive, by the community selection system from a client data processing system of a user, content authored by the user to be published;
perform, by a content analysis engine executing within the community selection system, content analysis on the content to identify a context of the content;
identify, by the community selection system, one or more social collaboration communities to which the user belongs using a user registry data structure;
select, by the community selection system, a social collaboration community based on the identified one or more social collaboration communities to which the user belongs, the context of the content, and a community registry data structure of social collaboration communities;
publish, by the community selection system, the content to a community server data processing system in the selected social collaboration community;

receive, by the community selection system, feedback from the selected social collaboration community regarding the content;

analyze, by a feedback analysis engine executing within the community selection system, the feedback; and determine, by the community selection system, whether to republish the content to a second social collaboration community within the community registry data structure based on results of analyzing the feedback.

14. The apparatus of claim 13, wherein the second community has a wider audience than the social collaboration community.

15. The apparatus of claim 13, wherein the second community has an audience with a higher expertise level than the social collaboration community.

16. The apparatus of claim 13, wherein the instructions further cause the processor to:

determine whether to return the content to the user to edit based on results of analyzing the feedback.

17. The apparatus of claim 16, wherein the instructions further cause the processor to:

receive edited content from the user; and publish the edited content to the social collaboration community.

18. The apparatus of claim 13, wherein the second community has an audience with a lower expertise level than the social collaboration community.

* * * * *